(12) United States Patent
Hardin et al.

(10) Patent No.: US 6,522,553 B2
(45) Date of Patent: Feb. 18, 2003

(54) SHEET METAL GUIDE FOR DOCKING PERIPHERAL CARRIERS

(75) Inventors: George Truman Hardin, Hattiesburg, MS (US); Timothy Radloff, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 09/769,796

(22) Filed: Jan. 25, 2001

(65) Prior Publication Data

US 2002/0097554 A1 Jul. 25, 2002

(51) Int. Cl.[7] .................................................. H05K 7/14
(52) U.S. Cl. ...................... 361/756; 361/686; 361/741; 361/801; 211/41.17; 312/223.2
(58) Field of Search ................................. 361/686, 741, 361/756, 802, 825, 801; 211/26, 41.17; 312/223.1, 223.2

(56) References Cited

U.S. PATENT DOCUMENTS

| | | | | |
|---|---|---|---|---|
| 3,731,157 A | * | 5/1973 | Reimer ........................ 361/756 |
| 4,519,016 A | * | 5/1985 | Bradley et al. ........... 211/41.17 |
| 4,758,928 A | * | 7/1988 | Wierec et al. ............ 211/41.17 |
| 4,780,570 A | * | 10/1988 | Chuck .................... 174/35 GC |
| 4,872,212 A | * | 10/1989 | Roos et al. ............ 174/35 GC |
| 5,191,514 A | * | 3/1993 | Kabat et al. .............. 211/41.17 |
| 5,584,396 A | * | 12/1996 | Schmitt ........................ 211/26 |
| 5,652,695 A | | 7/1997 | Schmitt |
| 6,288,902 B1 | * | 9/2001 | Kim et al. ................... 206/701 |
| 6,322,175 B1 | * | 11/2001 | Aggus et al. ............. 211/41.17 |

* cited by examiner

Primary Examiner—Jayprakash N. Gandhi
(74) Attorney, Agent, or Firm—Haynes and Boone, LLP

(57) ABSTRACT

A guide for docking a peripheral carrier in a computer chassis includes a support surface in a peripheral bay. A plurality of spaced apart guide members are formed in the support surface. Each guide member is substantially raised above the surface. A tab extends from each guide member and a lead-in is formed on the tab.

11 Claims, 2 Drawing Sheets

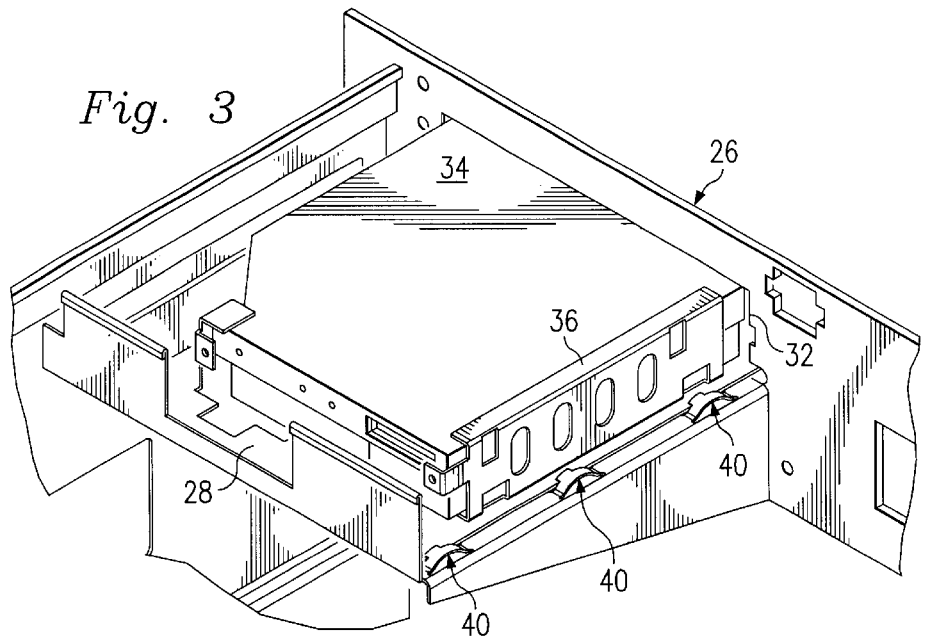
Fig. 3
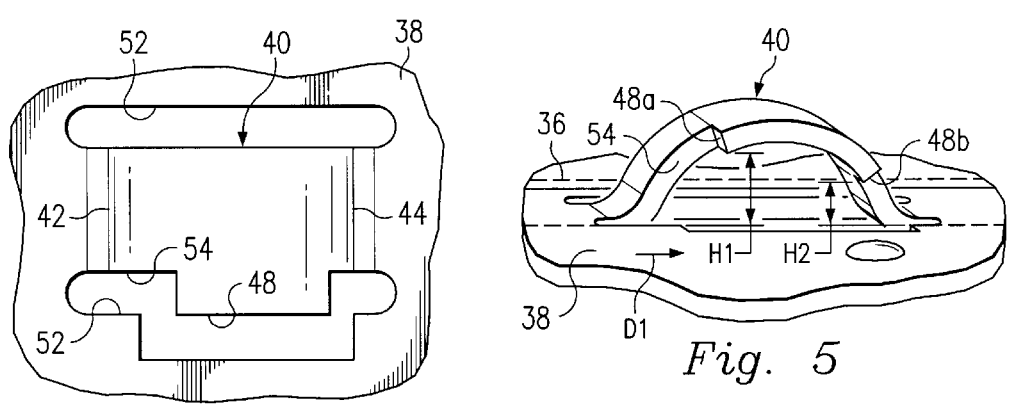
Fig. 4
Fig. 5
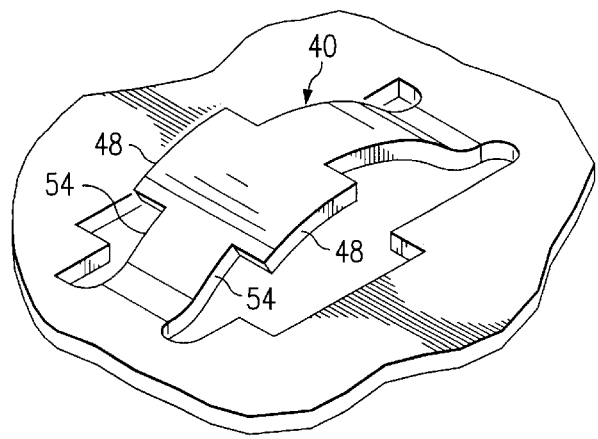
Fig. 6

SHEET METAL GUIDE FOR DOCKING PERIPHERAL CARRIERS

BACKGROUND

The disclosures herein relate generally to computer systems and more particularly to a sheet metal guide for docking peripheral carriers in a computer chassis.

Existing sheet metal forms do not provide consistent close tolerances necessary to provide a smooth, reliable sliding action for a removable docking peripheral carrier. Alternatively many current forms rely on additional sheet metal or plastic parts for guide features, which results in more volume necessary in the chassis to accommodate the docking peripheral.

A typical hard drive carrier is described in U.S. Pat. No. 5,652,695. This type of carrier is inserted through a slot and into a peripheral bay of a computer chassis.

Currently, a common approach is to provide guide rails formed of sheet metal having a formed tab that is open to the inside. The tab includes a "double bend" feature meaning that it involves two right angle bends with the associated tolerance stackups which make the vertical clearance for this feature hard to maintain. This makes it very difficult to achieve a smooth precise sliding feature as desired for removable peripherals, etc. They will either be too loose or too tight depending on manufacturing and material variations. Another method to solve this problem is to develop secondary injection molded plastic guide rail parts which add a minimum nominal plastic wall thickness to the vertical dimension stackup and prevent implementation in some slim profile docking peripheral applications.

Therefore, what is needed is a close tolerance sheet metal form feature that provides consistent tolerances in multiple directions of support for a sliding peripheral carrier and provides a lead-in to enhance blind assembly.

SUMMARY

One embodiment, accordingly, provides a semi-circular form feature for providing an accurate dual axis retention and guide device for a sliding insert. To this end, a slide member guide includes a support surface and a guide member formed in the support surface. The guide member is substantially raised above the surface. A tab extends from the guide member and a lead-in is formed on the guide member.

A principal advantage of this embodiment is that a retention tab is punched out of a metal sheet and provides an accurate dual axis retention device. The device is cost effective and accurate and can be provided in a single sided form or, alternatively in a double sided form, for center guiding two adjacent peripherals. Additional clearance on a leading portion provides a lead-in to enhance blind assembly. This embodiment has application to any scenario where a sliding part is captured by sheet metal features.

BRIEF DESCRIPTION OF THE DRAWINGS

FIG. 3 is a partial perspective view illustrating an embodiment of a peripheral device and a carrier.

FIG. 4 is a top view illustrating an embodiment of a support surface including a guide member.

FIG. 5 is a perspective view illustrating an embodiment of the guide member.

FIG. 6 is a perspective view illustrating another embodiment of the guide member.

DETAILED DESCRIPTION

Figure 1:
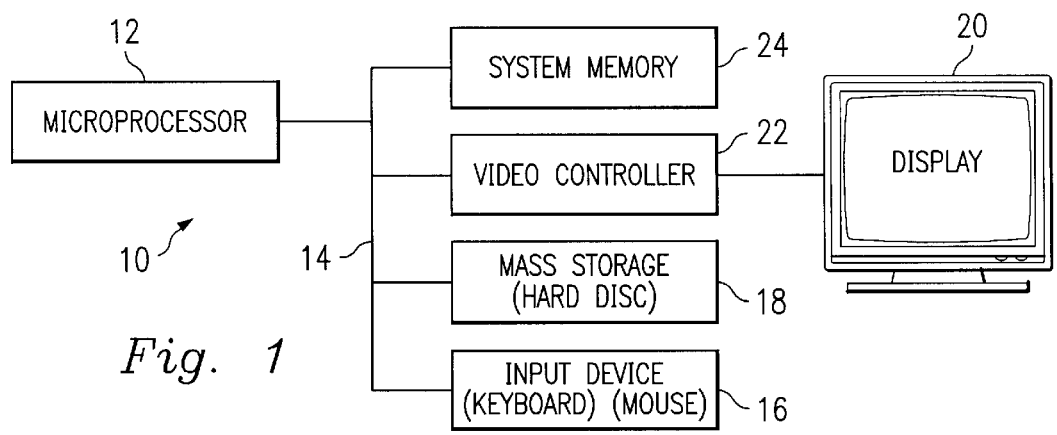
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
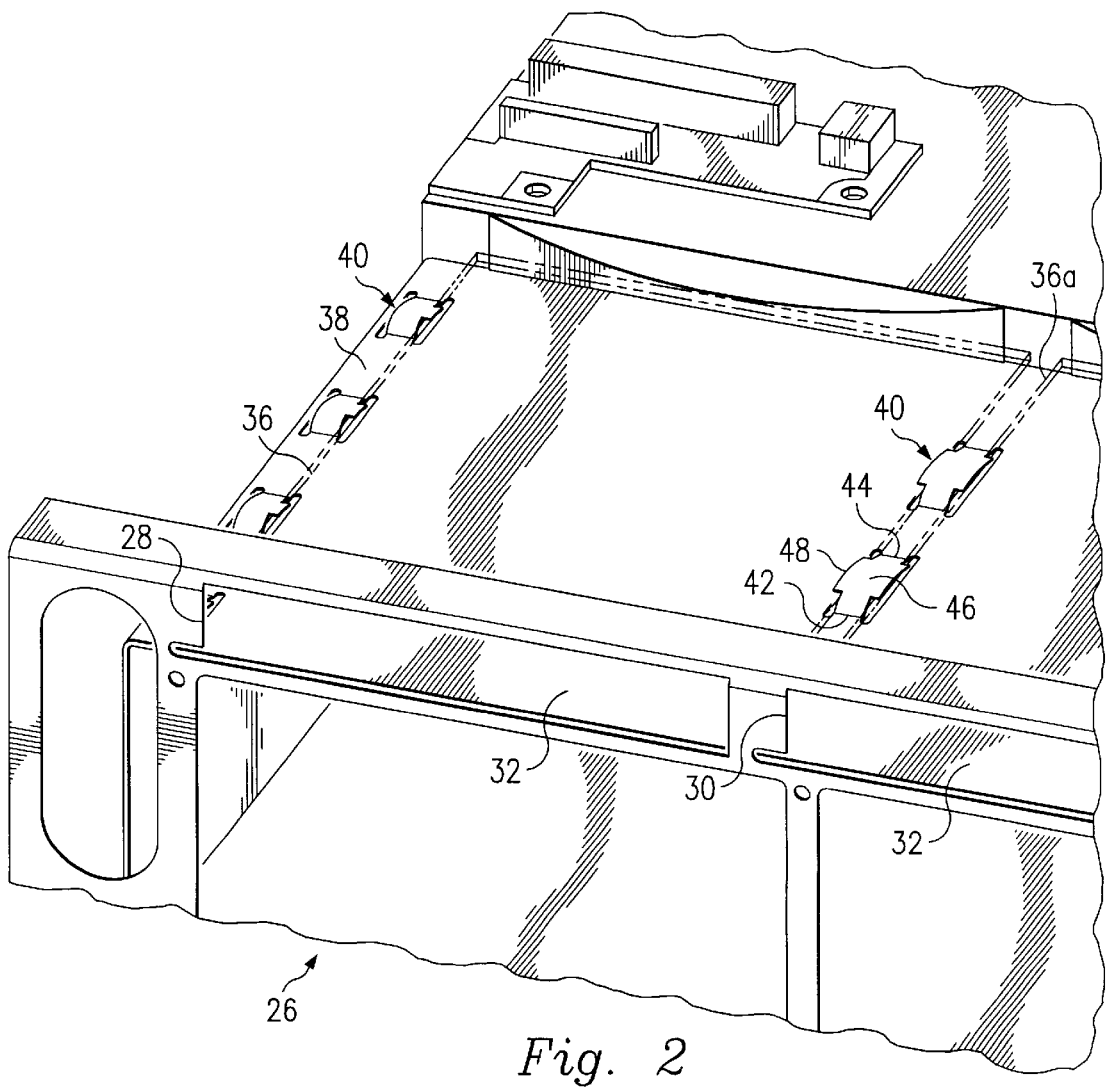
FIG. 2 is a partial perspective view illustrating an embodiment of a computer chassis.

The system 10 is housed in a computer chassis 26, FIG. 2. At least one peripheral bay 28 is provided in chassis 26 and possibly additional bays are provided such as a bay 30 positioned side-by-side with bay 28. An opening 32 is provided for each bay 28, 30. Opening 32 is opened when it is desired to insert a peripheral device 34 mounted in a carrier 36 into chassis 26, see also FIG. 3.

Returning to FIG. 2, carrier 36 is illustrated in phantom as positioned in bay 28 and another carrier 36a is positioned in bay 30. The carrier 36 is supported on a sheet metal support surface 38 in chassis 26. A plurality of spaced apart guide members 40 are formed in the support surface 38. Each guide member 40 includes a first end 42 and a second end 44. Each end 42, 44 is continuous with support surface 38. A mid-portion 46 of each guide member 40 is between the ends 42,44. The mid-portion 46 is raised above the surface 38 as explained below. At least one tab 48 extends from each guide member 40, and a lead-in is formed on each guide member.

FIG. 4 illustrates a top view of guide member 40 formed in support surface 38. A punching operation removes material from support surface 38 and leaves a pair of spaced apart voids 52 formed in support surface 38. A pressing operation then deforms guide member 40 to an arcuate form in a raised position above surface 38. Guide member 40 includes the first end 42 and the second end 44 continuous with surface 38. Also, an edge 54 of guide member 40 includes the tab 48 extending therefrom.

FIG. 5 illustrates the deformed guide member 40 raised above the support surface 38. Tab 48 has a leading edge 48a raised above support surface 38 at a first height H1, and has a trailing edge 48b raised above the support surface 38 at a second height H2, which is less than H1, i.e. H2 is the approximate height of carrier 36. In this manner a lead-in is provided to accommodate blind insertion of carrier 36 so as to avoid carrier 36 "hanging up" on the leading edge 48a when carrier 36 is inserted in a direction designated by a directional arrow D1.

As an alternative, where there is side-by-side support of carriers 36, 36a, FIGS. 2 and 6, guide member 40 may have a tab 48 extending from each opposed edge 54. Thus each tab 48 is formed to include the lead-in as discussed above.

As it can be seen, the principal advantages of these embodiments are that a retention and guide tab is punched out of a metal sheet and provides an accurate dual axis retention device, i.e., the edge 54 of guide member 40 restrains lateral movement of carrier 36, and the trailing edge 48b of tab 48 restrains vertical movement. The device is cost effective and accurate and can be provided in a single sided form or, alternatively in a double sided form, for center guiding two adjacent peripherals. Additional clearance on a leading portion provides a lead-in to enhance blind assembly. Additionally, the tab is very resistant to damage and therefore more accurate and reliable. Various sliding insert devices can be guided and retained in the manner disclosed.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A slide member guide comprising:
   a support surface;
   a guide member formed in the support surface, the guide member having a first end and a second end continuous with the support surface and a mid-portion raised above the surface;
   a tab extending from an edge of the guide member, the tab having a leading end and a trailing end; and
   a lead-in formed on the guide member by means of the leading end being at a first height above the surface and the trailing end being at a second height above the surface, less than the first height.

2. The guide as defined in claim 1 wherein the surface is formed of sheet metal and the guide member is formed from the sheet metal.

3. The guide as defined in claim 1 wherein the guide member includes a pair of opposed edges, and a tab extends from each of the opposed edges.

4. The guide as defined in claim 3 wherein the lead-in is provided on each tab.

5. A guide for docking peripheral carriers in a computer comprising:
   a chassis;
   a peripheral bay in the chassis;
   a support surface in the bay;
   a plurality of spaced apart guide members formed in the support surface, each guide member being substantially arcuate and raised above the surface;
   a tab extending from an edge of each guide member, the tab having a leading end and a trailing end;
   a lead-in formed on the tab; and
   the leading end being at a first height above the surface and the trailing end being at a second height above the surface, less than the first height, whereby the lead-in is provided.

6. The guide as defined in claim 5 wherein the surface is formed of sheet metal and the guide member is formed from the sheet metal.

7. A computer system comprising:
   a chassis;
   a microprocessor mounted in the chassis;
   a storage coupled to the microprocessor;
   a support surface in the chassis;
   a plurality of spaced apart guide members formed in the support surface, each guide member having a first end and a second end continuous with the support surface and a mid-portion raised above the surface;
   a tab extending from an edge of each guide member, the tab having a leading end and a trailing end;
   a lead-in formed on the tab; and
   the leading end being at a first height above the surface and the trailing end being at a second height above the surface, less than the first height, whereby the lead-in is provided.

8. The system as defined in claim 7 wherein the surface is formed of sheet metal and the guide member is formed from the sheet metal.

9. A method for guiding and securing a peripheral in a computer chassis comprising:
   providing a support surface;
   forming a plurality of spaced apart guide members in the support surface so that each guide member includes a first end and a second end continuous with the support surface and a mid-portion raised above the surface;
   extending a tab from an edge of each guide member the tab having a leading end and a trailing end;
   forming a lead-in on the tab; and
   forming the leading end at a first height above the surface and the trailing end at a second height above the surface, less than the first height, whereby the lead-in is provided.

10. The method as defined in claim 9 including forming each guide member in a substantially arcuate shape.

11. A slide member guide comprising:
    a support surface;
    a guide member formed in the support surface, the guide member having a first end and a second end continuous with the support surface and a mid-portion raised above the surface; and
    a tab extending from the guide member and having a leading end and a trailing end, the leading end being at a first height above the surface and the trailing end being at a second height above the surface, less than the first height, whereby a lead-in is formed on the guide member.

* * * * *